Aug. 18, 1959
C. ZELNICK
2,899,839
APPARATUS FOR EXTENDING THE LENGTH OF A
MEASURING TAPE WINDING CRANK HANDLE
Filed July 25, 1956
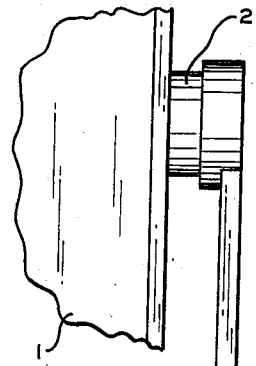
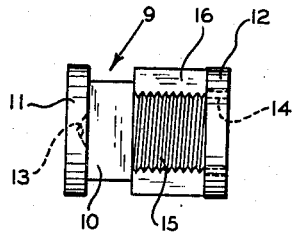
FIG. 6
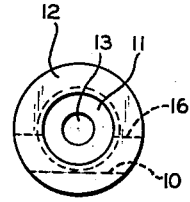
FIG. 5
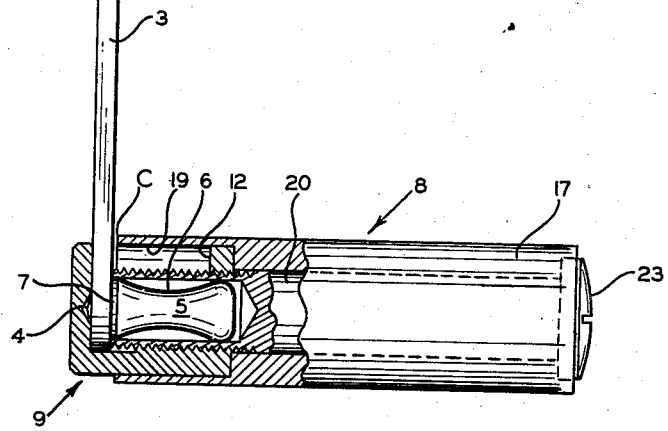
FIG. 1
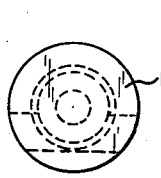
FIG. 4
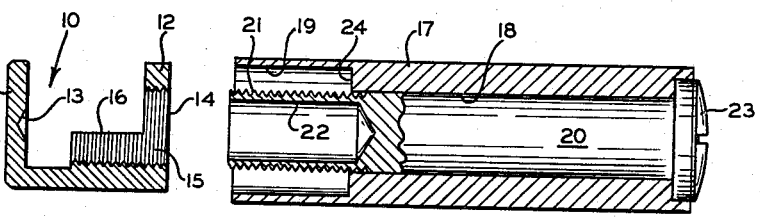
FIG. 2   FIG. 3
INVENTOR.
CHARLES ZELNICK
BY
*Fearman & Fearman*
ATTORNEYS 2,899,839
Patented Aug. 18, 1959

2,899,839

APPARATUS FOR EXTENDING THE LENGTH OF A MEASURING TAPE WINDING CRANK HANDLE

Charles Zelnick, Saginaw, Mich., assignor to Lufkin Rule Company, Saginaw, Mich.

Application July 25, 1956, Serial No. 600,032

8 Claims. (Cl. 74—545)

This invention relates to measuring tape winding drums and more particularly to apparatus for extending the length of the handle with which the winding crank of such a drum customarily is equipped.

Measuring tape winding drums of the kind referred to usually include a shaft about which the tape is wound and a crank for rotating the shaft. In manually operable drums, the crank is equipped with a handle to be gripped by the fingers of the operator, and in those instances where the tape is several hundreds of feet in length, it is difficult for the operator to wind up the tape after use because of the limited purchase he may obtain on the finger grip.

An object of the invention is to provide apparatus for extending the length of a tape drum winding crank handle.

Another object of the invention is to provide apparatus for attachment to the crank of a tape winding drum for extending the length of the handle with which the crank is equipped and in which the handle extension is anchored to the handle at a plurality of points so as to preclude wobbling of the extension.

A further object of the invention is to provide handle extension apparatus of the kind referred to which is simple in construction, economical in manufacture, and durable in use.

Other objects and advantages of the invention will be pointed out specifically or will become apparent from the following description of the apparatus when considered in conjunction with the appended claims and the accompanying drawing, in which:

Figure 1 is a fragmentary view, partly in elevation and partly in section, of a tape winding drum equipped with handle extension apparatus constructed in accordance with the invention;

Figure 2 is a sectional view of a part of the handle extension apparatus shown in Figure 1;

Figure 3 is a sectional view of the other parts of the handle extension apparatus shown in Figure 1;

Figure 4 is an end view of the part shown in Figure 2, the view being taken looking from left to right of Figure 2;

Figure 5 is an end view from the other end of Figure 2; and

Figure 6 is a top plan view of Figure 2.

A tape winding drum of the kind with which the invention is intended for use may comprise a drum casing 1 in which is journaled a shaft 2 on which a measuring tape (not shown) may be wound, the shaft having secured thereto a crank 3. The free end of the crank may have an opening through which extends a pin 4 on which is rotatably mounted a handle 5. The handle 5 usually is so shaped that its end portions are of the same diameter and are spaced apart by an intermediate section 6 of reduced diameter to provide a finger grip for the operator. It is preferred that the extremity of the handle which lies adjacent to the crank 3 be machined to form a flat annular surface 7 for a reason to be explained hereinafter.

Apparatus constructed in accordance with the invention for extending the length of the crank handle 5 is designated in the drawings by the numeral 8 and comprises a generally cylindrical body member 9 having a portion of its top and side walls cut away to form a slot 10 for the reception of the crank handle 5 and the lower portion of the crank 3. The slot 10 does not extend the entire length of the body member 9, but terminates short of each end so as to form rear and front walls 11 and 12, respectively. The inner surface of the rear wall 11 of the body member 9 may be recessed as at 13 to receive the end of the handle mounting pin 4 so that when the handle 5 and the lower end of the crank are inserted in the slot 10 the side of the crank 3 may lie flush against the rear wall 11 of the body member 9. The front wall 12 of the body member is provided with an opening 14 towards which the crank handle 5 extends when the latter is received in the slot of the body member, the opening 14 being internally threaded as at 15. As is best shown in Figure 2, the slot 10 in the body member is not uniform in depth, but is deeper towards the rear wall 11 than it is towards the front wall of the body member. Thus, the side walls of the body member provide an intermediate substantially semi-circular wall portion 16 in which the threads 15 continue.

The construction includes a tubular member or hand grip 17 having a bore 18 extending therethrough and having a counter-bore 19 at one end of a dimension to accommodate the body member 9.

Means for fastening the members 9 and 17 in non-wobbling relation with respect to each other and with respect to the crank 3 is provided and comprises a bolt element 20 adapted for reception within the bore 18 of the tubular member 17, and having an externally threaded end 21 of such size as to be threadedly accommodated within the opening 14 of the body member 9. The threaded end of the element 20 is provided with a tapped opening 22 of a length wholly to receive the crank handle 5 and having an internal diameter or dimension of such size as to engage the enlarged end portions of the handle 5. At its other end, the element 20 is provided with a screw head 23 which is adapted to be partially received in a counterbore in the corresponding end of the tubular member 17 and prevent inadvertent separation of the parts.

To assemble the handle extension apparatus 8, the body member 9 is separated from the other parts of the apparatus and is canted so as to enable the crank handle 5 and the lower part of the crank 3 to be inserted into the body member through the slot 10. Then the tubular member 17 and the fastening element 20 may be assembled in the manner shown in Figure 3, and the threaded end 21 of the fastening element 20 may be introduced to the opening 14 of the body member 9 whereupon the element 20 may be threaded into the body member 9 to such an extent that the end of the member 20 bears against the face of the crank 3 so as to clamp the latter firmly between the rear wall 11 of the body member and the adjacent end of the element 20. As the element 20 is threaded into the body member 9, the tubular member 17 will be pushed by the screw head 23 towards the crank 3 until the base 24 of the counterbore 19 seats against the outer face of the front wall 12 of the body member 9. The length of the counterbore 19 is a trifle shorter than the distance from the front face of the wall 12 to the crank 3 so as to provide a small clearance C between the end of the member 17 and the adjacent face of the crank 3, thereby enabling the member 17 to be rotatable about the element 20 without interference from the crank 3.

When the parts of the extension apparatus are attached to the crank 3, the flat surface 7 on the crank handle 5 is in circumferential engagement with the bore 22 of the element 20 and the outer end of the crank handle 5 also is in circumferential engagement with the bore 22. Thus, the crank handle 5 provides a plurality of spaced points on which the handle attachment is supported, thereby assuring a non-wobbling assembly of parts.

The disclosed embodiment is representative of a preferred form of the invention, but it is intended to be illustrative rather than definitive of the invention. The invention is defined in the claims.

I claim:

1. Apparatus for extending the length of a tape drum winding crank handle, said apparatus comprising a body member slotted for reception of the handle and a portion of the crank, said body member having an opening therein towards which the handle faces when the latter is received within said slot; a tubular member having a bore at one end of a dimension to accommodate said body; a fastening element for insertion within said tubular member and having one of its ends open for accommodation of the crank handle; and means on said fastening element for securing said members in assembled relation.

2. Apparatus for extending the length of a tape drum winding crank handle, said apparatus comprising a body member slotted for reception of the handle and a portion of the crank, said body member having a threaded opening therein towards which the handle faces when the latter is received within said slot; a tubular member having a bore at one end of a diameter to accommodate said body; a fastening element for insertion within said tubular member and having one of its ends open for the accommodation of the crank handle, said one end of said element being threaded for engagement with the threads in said body opening; and means on the other end of said fastening element for securing said members in assembled relation.

3. Apparatus for extending the length of a tape drum winding crank handle, said apparatus comprising a body member slotted for reception of the handle and a portion of the crank and having an opening therein towards which the handle faces when the latter is received within said slot but which is of greater dimension than the corresponding dimension of said handle; a tubular member having a bore at one end of a dimension to accommodate said body; a fastening element for insertion within said tubular member and being of such size at one end to be accommodated within the opening of said body member, said fastening element having an opening at said one of its ends of a dimension to receive snugly said handle; and means on said fastening element for securing said members in assembled relation.

4. Apparatus for extending the length of a tape drum winding crank handle, said apparatus comprising a body member slotted for reception of the handle and a portion of the crank and having a threaded opening therein towards which the handle faces when the latter is received witin said slot but which is of greater dimension than the corresponding dimension of said handle; a tubular member having a bore at one end of a dimension to accommodate said body; a fastening element for insertion within said tubular member and being of such size at one end to be accommodated within the opening of said body member, said fastening element being threaded at said one end for threaded engagement with the threads of said body member opening and having an opening at said one of its ends of a dimension to receive snugly said handle; and means on said fastening element for securing said members in assembled relation.

5. Apparatus for extending the length of a tape drum winding crank handle, said apparatus comprising a body member slotted for reception of the handle and a portion of the crank and having an opening therein towards which the handle faces when the latter is received within the slot but which is of greater dimension than the corresponding dimension of said handle; a tubular member having a bore at one end of a dimension to accommodate said body; a fastening element for insertion within said tubular member and being of a size at one end to be accommodated within the opening of said body member, said fastening element having an opening at said one of its ends of such size as wholly and snugly to receive said handle; and means on said fastening element for securing said members in assembled relation.

6. The combination with a tape drum winding crank having a handle, of apparatus for extending the length of the handle, said apparatus comprising a body member having a slot into which said handle and a portion of said crank are received, said body member having an opening towards which said handle extends; a tubular member having a bore at one end receiving said body member; a fastening element received within said tubular member and said body member and having an opening at one end receiving said handle; and means on said fastening element securing said members in assembled relation on said crank.

7. The combination with a tape drum winding crank having a handle the two ends of which are of uniform size, and are spaced by an intermediate portion of smaller size, of apparatus for extending the length of the handle, said apparatus comprising a body member having a slot into which said handle and a portion of said crank are received, said body member having an opening towards which said handle extends; a tubular member having a bore at one end receiving said body member; a fastening element received within said tubular member and said body member and having an opening at one end receiving said handle, said fastening element opening being of such size as to receive and snugly engage the ends of said handle; and means on said fastening element securing said members in assembled relation on said crank.

8. Apparatus for extending the length of a handle connected to a winding crank and extending in a direction substantially normal to said crank, said apparatus comprising an element longer than said handle and having an opening therein of such size as to receive said handle and a portion of said crank, said element extending from said crank in the same direction as said handle when said handle and said crank portion are received in said opening; and means in engagement with said element and adapted for engagement with said crank for holding said element and said handle in assembled relation on said crank.

References Cited in the file of this patent
UNITED STATES PATENTS

| | | |
|---|---|---|
| 1,016,448 | Smith | Feb. 6, 1912 |
| 1,191,855 | Tuszka | July 18, 1916 |
| 1,423,406 | Donley | July 18, 1922 |
| 1,432,891 | Newcom | Oct. 24, 1922 |
| 1,663,606 | Murphy | Mar. 27, 1928 |
| 1,670,453 | Klous | May 22, 1928 |
| 1,702,511 | Karlovick | Feb. 19, 1929 |
| 2,057,201 | McCluskey | Oct. 13, 1936 |
| 2,641,939 | McKee | July 16, 1953 |